United States Patent
Otoguro et al.

(10) Patent No.: US 10,274,860 B2
(45) Date of Patent: Apr. 30, 2019

(54) METHOD FOR MANUFACTURING LIGHT SCANNING APPARATUS, AND IMAGE FORMING APPARATUS

(71) Applicant: CANON KABUSHIKI KAISHA, Tokyo (JP)

(72) Inventors: Yasuaki Otoguro, Abiko (JP); Yuichiro Imai, Tokyo (JP); Yuta Okada, Moriya (JP); Daisuke Aruga, Abiko (JP); Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/891,057

(22) Filed: Feb. 7, 2018

(65) Prior Publication Data
US 2018/0231915 A1    Aug. 16, 2018

(30) Foreign Application Priority Data
Feb. 15, 2017    (JP) ................. 2017-025990

(51) Int. Cl.
*G02B 26/12*  (2006.01)
*G02B 7/182*  (2006.01)
*G03G 15/04*  (2006.01)

(52) U.S. Cl.
CPC ....... *G03G 15/04072* (2013.01); *G02B 7/182* (2013.01); *G02B 26/125* (2013.01); *G02B 26/12* (2013.01); *G03G 2215/0404* (2013.01)

(58) Field of Classification Search
CPC ....... G03G 15/04036; G03G 15/04072; G02B 26/125; G02B 7/182
See application file for complete search history.

(56) References Cited

U.S. PATENT DOCUMENTS 6,488,798 B1 * 12/2002 Thornton ................ B29C 65/56
                                                     156/154
7,072,087 B2    7/2006 Nakahata .................... 359/204.1
(Continued)

FOREIGN PATENT DOCUMENTS

| JP | 2009-169123 | 7/2009 |
| JP | 2014-209161 | 11/2014 |
| JP | 2015-099178 | 5/2015 |

OTHER PUBLICATIONS

Extended European Search Report dated Jul. 4, 2018 in counterpart European Application No. 18156684.5.
(Continued)

*Primary Examiner* — Carla J Therrien
(74) *Attorney, Agent, or Firm* — Venable LLP

(57) ABSTRACT

A method of manufacturing a light scanning apparatus, including: forming an optical box having a plurality of protrusions arranged along a longitudinal direction of a reflection mirror and provided at positions corresponding to one end side and the other end side of the reflection mirror in the longitudinal direction, respectively; processing protrusions except protrusions that are used for supporting the reflection mirror so that the protrusions except the protrusions that are used for supporting the reflection mirror on the one end side and on the other end side of the reflection mirror are out of contact with the reflection mirror; placing the reflection mirror on the protrusions that have not been processed in the processing; and fixing the reflection mirror, which has been placed on the protrusions that have not been processed in the placing, to the optical box.

56 Claims, 9 Drawing Sheets

(56) References Cited

U.S. PATENT DOCUMENTS

| | | | |
|---|---|---|---|
| 7,298,390 B2 | 11/2007 | Nakahata | 347/231 |
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2008/0002019 A1* | 1/2008 | Bang | G02B 7/18 347/242 |
| 2008/0117486 A1* | 5/2008 | Andoh | G02B 5/0858 359/198.1 |
| 2009/0244670 A1 | 10/2009 | Sato et al. | 359/205.1 |
| 2012/0081770 A1 | 4/2012 | Sato et al. | 359/204.1 |
| 2014/0071508 A1 | 3/2014 | Yamada et al. | 359/205.1 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/702,219, filed Sep. 12, 2017.
U.S. Appl. No. 15/891,064, filed Feb. 7, 2018.
U.S. Appl. No. 15/891,087, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

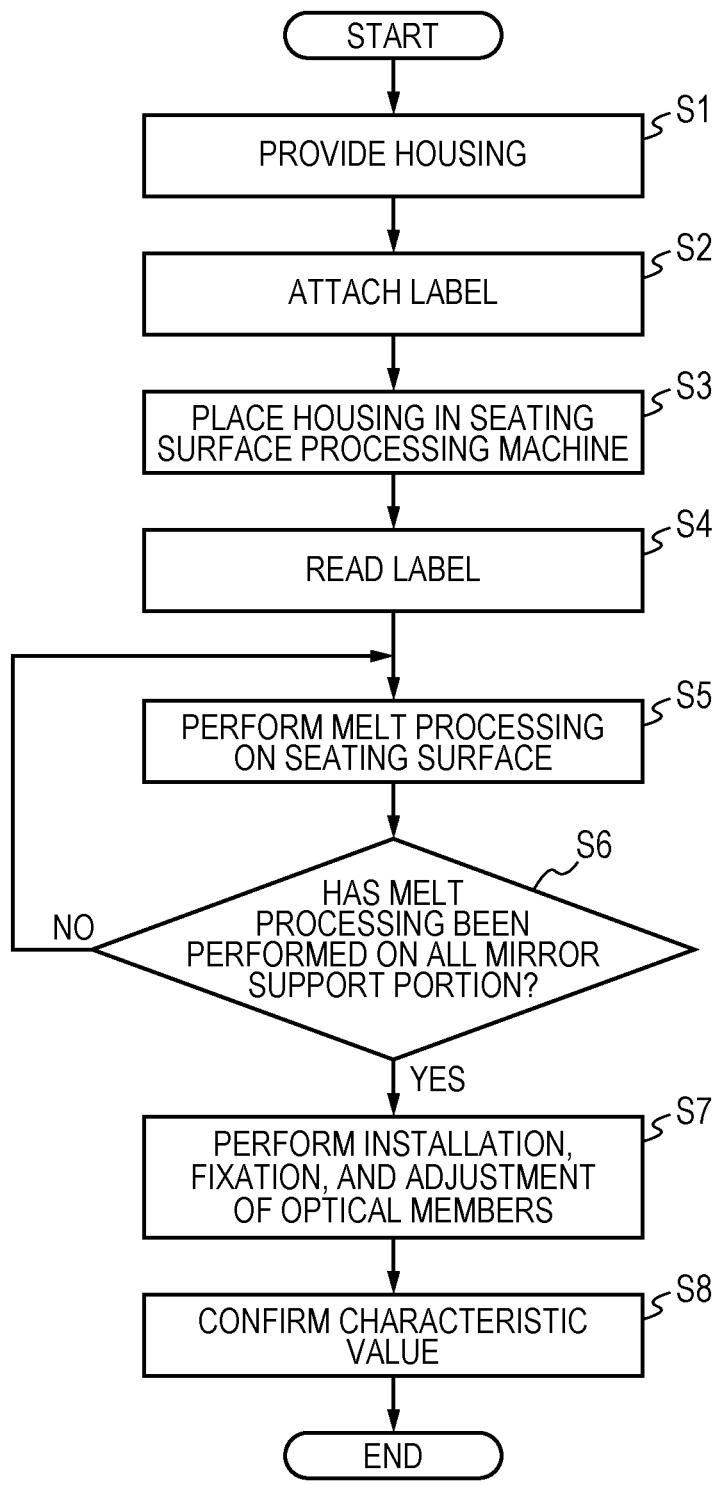

METHOD FOR MANUFACTURING LIGHT SCANNING APPARATUS, AND IMAGE FORMING APPARATUS

BACKGROUND OF THE INVENTION

Field of the Invention

The present invention relates to a method of manufacturing a light scanning apparatus that is used in an image forming apparatus such as a copier, a printer and a facsimile; and the image forming apparatus.

Description of the Related Art

An image forming apparatus that forms an image includes a light scanning apparatus which exposes a photosensitive member to light. The light scanning apparatus deflects a laser light emitted from a laser light source by a rotary polygon mirror provided in the inside, further changes the optical path of the deflected laser light to a direction of a photosensitive member by a reflection mirror, and thereby exposes the photosensitive member to light to form a latent image. The reflection mirror is a small member having a slim shape in order to save a space and reduce a cost of an optical element, because laser beams fly over in the light scanning apparatus. The reflection mirror is placed in a mirror supporting portion provided inside the housing of the light scanning apparatus, and is fixed to the mirror supporting portion by an elastic member. FIGS. 9A, 9B and 9C are schematic views for describing a support structure of a general reflection mirror 162. In FIG. 9B, such a structure is adopted that an elastic member 172 presses the reflection mirror 162 toward the mirror supporting portions 170 and 171 to fix the reflection mirror 162. FIG. 9A illustrates the mirror supporting portions 170 and 171 in such a state that the reflection mirror 162 is removed; and FIG. 9B illustrates a state in which the reflection mirror 162 is placed on the mirror supporting portions 170 and 171. In addition, FIG. 9C is a perspective view illustrating the shape of the elastic member 172 which fixes the reflection mirror 162 to the mirror supporting portions 170 and 171. As is illustrated in FIG. 9A, usually, the mirror supporting portions 170 and 171 are provided in the vicinity of both ends of the reflection mirror 162 in the longitudinal direction. As is illustrated in FIG. 9B, the bottom face side of the reflection mirror 162 is supported by the two mirror supporting portions 171, and the back face portion of the reflection surface of the reflection mirror 162 is supported by the mirror supporting portion 170. Incidentally, the back face side of the reflection surface of the reflection mirror 162 is supported by one seating surface 170a of the mirror supporting portion 170 provided on the left side in FIG. 9A, and by two seating surfaces 170b of the mirror supporting portion 170 provided on the right side.

The image forming apparatus not only has the light scanning apparatus, but also in the vicinity, has movable portions such as a paper conveying roller which conveys paper, a photosensitive member and an intermediate transfer body of an image forming portion, a fixing belt and rollers; and a driving system which drives the movable portions, provided therein. When a print job is executed, there is a possibility that the driving system such as a motor which drives these movable portions works, vibration generated by the driving system propagates also to the light scanning apparatus through the movable portions, and that the reflection mirror 162 vibrates. When the reflection mirror 162 vibrates, the direction of the laser light reflected by the reflection mirror 162 ends up changing along with the vibration of the reflection mirror 162, the imaging position on the photosensitive drum ends up deviating from the original position, and image unevenness such as a stripe pattern occasionally occurs on an image to be formed. Then, it has been investigated to shift a frequency of the vibration generated by the driving system and a resonance frequency with the reflection mirror 162, by such countermeasures as to attach a vibration damping member to the reflection mirror 162, partially apply a pressing force by an elastic member, or bond a part thereof. Japanese Patent Application Laid-Open No. 2014-209161, for instance, proposes such a structure as to be capable of moving a mirror supporting seating surface which supports a bottom face portion perpendicular to a reflection surface of the reflection mirror, in a longitudinal direction of the reflection mirror. According to this structure, the natural frequency of the reflection mirror can be shifted from a frequency of the vibration propagating from the movable portions of the image forming apparatus in such a state that the reflection mirror is placed in the housing of the light scanning apparatus, and the resonance of the reflection mirror can be suppressed.

However, in the case where the reflection mirror is fixed by being combined with a plurality of members as in the above described conventional technology, the natural frequency of the reflection mirror is affected by a boundary condition concerning the support of the reflection mirror and the structural stability in the vicinity of the seating surface which supports the member. As shown in Japanese Patent Application Laid-Open No. 2014-209161, in the case where the fixed seating surface of the reflection mirror is formed of a member different from the housing, and the fixed seating surface is fastened to the housing, such an operation becomes necessary as to move and adjust the fixed seating surface, and then fix the fixed seating surface to the housing. By the seating surface being fixed to the housing after the adjustment, the circumstance of the fastening structure changes, and the natural frequency of the reflection mirror ends up changing. In other words, even though the natural frequency of the reflection mirror is changed to a predetermined frequency by moving a position of the seating surface, there may be a case in which the vibration frequency ends up deviating from the predetermined frequency due to the fixing operation. As a result, a problem arises that a frequency of the vibration generated by a plurality of driving sources in the image forming apparatus coincides with the natural frequency of the reflection mirror, the reflection mirror largely vibrates, and simultaneously the image ends up deteriorating.

In recent years, there are many forms in which one light scanning apparatus copes with a plurality of resolutions and a plurality of printing speeds. Because of this, in order to configure the natural frequency of the reflection mirror so as not to coincide with the frequency of the vibration generated by the driving source and not to cause the resonance, by such countermeasures as to shift the position of the reflection mirror supporting seating surface, it is necessary to control the natural frequency of the member with high accuracy and always adjust the natural frequency to the predetermined frequency. Because of this, it becomes a problem that the supporting boundary condition of the member which supports the reflection mirror and the structure in the vicinity of the seating surface which supports the reflection mirror can be stably controlled.

SUMMARY OF THE INVENTION

The present invention has been designed under such circumstances, and an object of the present invention is to adjust the natural frequency of a reflection mirror which is supported by a light scanning apparatus, by a simple structure.

According to one embodiment of the present invention, a method of manufacturing a light scanning apparatus which comprises a light source, a rotary polygon mirror configured to deflect a light beam emitted from the light source, a reflection mirror configured to guide the light beam deflected by the rotary polygon mirror onto a photosensitive member, and an optical box to which the light source, the rotary polygon mirror and the reflection mirror are attached, the method comprising:

forming the optical box,
wherein the optical box which is formed by the forming has a plurality of protrusions arranged along a longitudinal direction of the reflection mirror, and
wherein the plurality of protrusions are provided at positions corresponding to one end side of the reflection mirror in the longitudinal direction of the reflection mirror which is attached to the optical box and positions corresponding to the other end side of the reflection mirror, respectively;
processing protrusions except protrusions that are used for supporting the reflection mirror so that a protrusion except a protrusion that is used for supporting the reflection mirror among the plurality of protrusions disposed on the one end side of the reflection mirror is out of contact with the reflection mirror, and so that a protrusion except a protrusion that is used for supporting the reflection mirror among the plurality of protrusions disposed on the other end side of the reflection mirror is out of contact with the reflection mirror;
placing the reflection mirror on the protrusions that have not been processed in the processing; and
fixing the reflection mirror, which has been placed on the protrusions that have not been processed in the placing, to the optical box.

Further features of the present invention will become apparent from the following description of exemplary embodiments with reference to the attached drawings.

BRIEF DESCRIPTION OF THE DRAWINGS

FIG. 4 is a flow chart for describing the assembly of members which constitute the light scanning apparatus of Embodiment 1.

DESCRIPTION OF THE EMBODIMENTS

Preferred embodiments of the present invention will now be described in detail in accordance with the accompanying drawings.

Embodiment 1

[Image Forming Apparatus]

Figure 1:
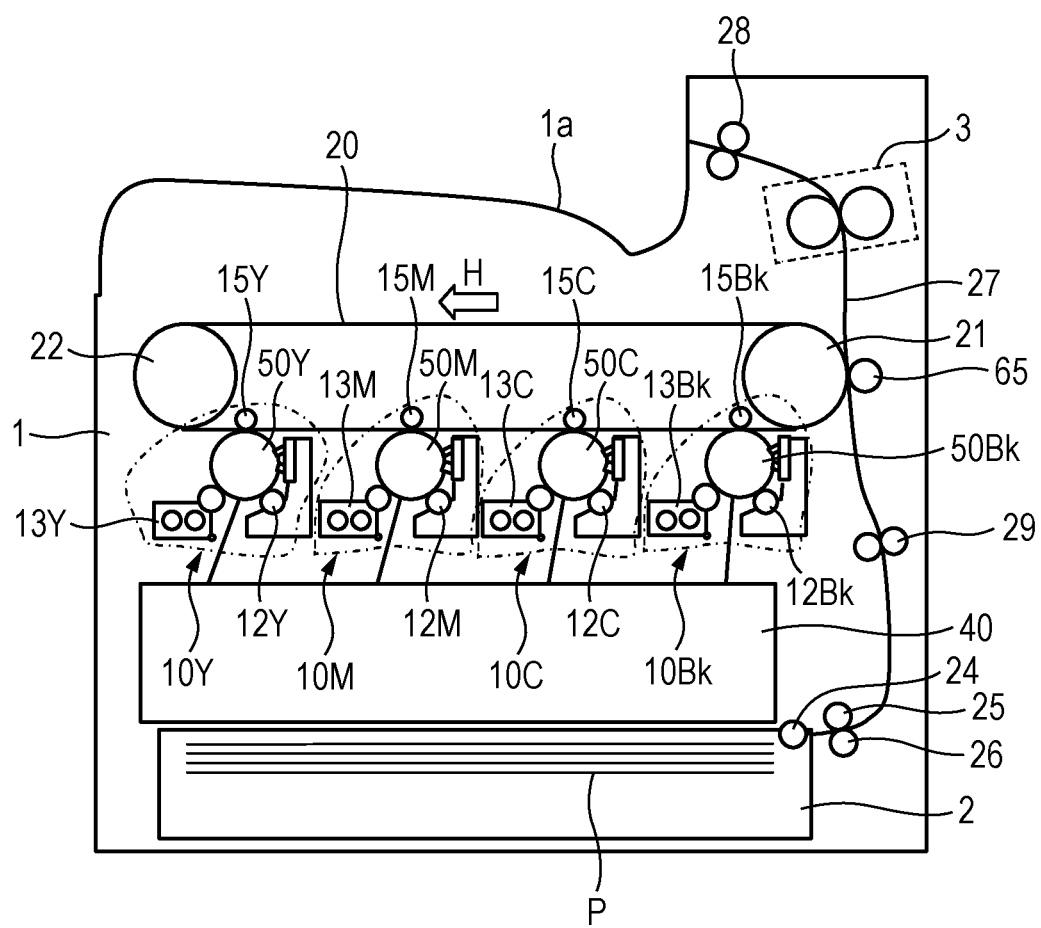
FIG. 1 is a schematic block diagram for describing an outline of an image forming apparatus of Embodiment 1.

The structure of the image forming apparatus according to Embodiment 1 will be described below. FIG. 1 is a schematic block diagram illustrating the whole structure of a tandem type of color laser beam printer of the present Embodiment. This laser beam printer (hereinafter simply referred to as printer) has four image forming engines (image forming portions) 10Y, 10M, 10C and 10Bk which form toner images of the respective colors of yellow (Y), magenta (M), cyan (C) and black (Bk) (illustrated by one-dot chain lines). In addition, the printer is structured so as to have an intermediate transfer belt 20 onto which toner images are transferred from the respective image forming engines 10Y, 10M, 10C and 10Bk, to transfer the toner image multiply-transferred to the intermediate transfer belt 20 onto a recording sheet P which is a recording medium, and thereby to form a color image. Hereafter, the reference characters Y, M, C and Bk which represent the respective colors are omitted except when necessary.

The intermediate transfer belt 20 is formed in an endless shape, is wound around a pair of belt conveying rollers 21 and 22, and is structured so that the toner image formed by the image forming engine 10 of each of the colors is transferred while the belt rotates in a direction of the arrow H. In addition, a secondary transfer roller (transfer member) 65 is provided at a position facing a belt conveying roller 21 in one side, while sandwiching the intermediate transfer belt 20 therebetween. The recording sheet P (hereinafter so simply referred to as sheet P as well) is inserted between the secondary transfer roller 65 and the intermediate transfer belt 20 which are brought into pressure-contact with each other, and the toner image is transferred thereto from the intermediate transfer belt 20. The above described four image forming engines 10Y, 10M, 10C and 10Bk are provided in parallel in the lower side of the intermediate transfer belt 20 in FIG. 1, and are structured so as to transfer the toner image that has been formed so as to correspond to image information of each of the colors, onto the intermediate transfer belt 20 (which will be hereinafter referred to as primary transfer). As for these four image forming engines 10, the image forming engine 10Y for yellow, the image forming engine 10M for magenta, the image forming engine 10C for cyan and the image forming engine 10Bk for black are provided in this order in a rotation direction (direction of arrow H) of the intermediate transfer belt 20.

In addition, in the lower side of the image forming engines 10 in FIG. 1, a light scanning apparatus 40 is provided that exposes the photosensitive drums 50 to light, which are photosensitive members provided in the respective image forming engines 10, according to image information. Incidentally, in FIG. 1, the detailed illustration and description of the light scanning apparatus 40 will be omitted, and will be described later with reference to FIGS. 2A and 2B. The light scanning apparatus 40 is used commonly for all of the image forming engines 10Y, 10M, 10C and 10Bk, and has unillustrated four semiconductor lasers that emit the laser beams which have been modulated according to the image information of respective colors. In addition, the light scanning apparatus 40 has a rotary polygon mirror 42 that deflects light beams so that the light beams corresponding to the respective photosensitive drums 50 scan along axial directions (depth direction, in FIG. 1) of the respective photosensitive drums 50, and has a motor unit 41 that rotates the rotary polygon mirror 42. The respective light beams that have been deflected by the rotary polygon mirror 42 are guided by optical members placed in the light scanning apparatus 40 to be guided onto the respective photosensitive drums 50 that are a surface to be scanned, and the photosensitive drums 50 are exposed to the respective light beams.

Each of the image forming engines 10 has a photosensitive drum 50, and a charging roller 12 that electrically charges the photosensitive drum 50 up to a uniform background potential. In addition, each of the image forming engines 10 has a developing device 13 that develops an electrostatic latent image formed on the photosensitive drum 50 by being exposed to the light beam and forms a toner image. The developing device 13 forms the toner image corresponding to the image information of each of the colors, on the photosensitive drum 50.

Primary transfer rollers 15 are provided at positions facing the photosensitive drums 50 of the image forming engines 10, respectively, so as to sandwich the intermediate transfer belt 20. A predetermined transfer voltage is applied to the primary transfer roller 15, and thereby the toner image on the photosensitive drum 50 is transferred to the intermediate transfer belt 20.

On the other hand, the recording sheet P is supplied to the inside of the printer from a feeding cassette 2 which is stored in the lower part of the printer housing 1, specifically, to a secondary transfer position at which the intermediate transfer belt 20 and the secondary transfer roller 65 are brought into contact with each other. On an upper part of the feeding cassette 2, a pickup roller 24 and a feeding roller 25 for drawing out the recording sheet P which is stored in the feeding cassette 2 are installed adjacently. In addition, a retard roller 26 for preventing double feeding of the recording sheet P is provided at a position facing the feeding roller 25. A conveying path 27 of the recording sheet P in the inside of the printer is provided approximately vertically along the right side surface of the printer housing 1. The recording sheet P that has been drawn from the feeding cassette 2 which is positioned at the bottom of the printer housing 1 moves up in the conveying path 27, and is sent to a registration roller 29 that controls the entry timing of the recording sheet P to the secondary transfer position. After that, the toner image is transferred onto the recording sheet P at the secondary transfer position, and then the recording sheet P is sent to a fixing device 3 (shown by dashed line) which is provided on the downstream side in the conveyance direction. Then, the recording sheet P on which the toner image has been fixed by the fixing device 3 passes through a discharge roller 28, and is discharged to a discharge tray 1a which is provided in an upper portion of the printer housing 1.

At the time when the printer structured in this way forms a full-color image, firstly, the light scanning apparatus 40 exposes the photosensitive drum 50 of each of the image forming engines 10 to light, according to image information of each of the colors, at predetermined timing. Thereby, a toner image corresponding to the image information is formed on the photosensitive drum 50 of each of the image forming engines 10. Here, in order to obtain a high quality image, the latent image formed by the light scanning apparatus 40 must be accurately reproduced on a predetermined position on the photosensitive drum 50. Furthermore, such an occurrence must be prevented that the optical elements in the light scanning apparatus 40 vibrate due to the vibration propagating from the driving source of the above described image forming apparatus (printer), as a result, the condensing position of the laser light on the photosensitive drum 50 deviates, and the image quality ends up deteriorating. Because of this, in order to prevent the frequency of the vibration generated in the driving source in the image forming apparatus and the natural frequency of the optical member in the light scanning apparatus 40 from coinciding with each other, such a structure is required as to be capable of leading the natural frequency of the optical member to a predetermined frequency in a state of being supported by the housing of the light scanning apparatus 40. Incidentally, each roller in the image forming apparatus is rotationally driven by unillustrated motors. It is acceptable to individually provide the motors for the above described plurality of rollers, and it is also acceptable to provide a common motor for a part of the rollers.

[Optical Element Supporting Structure of Light Scanning Apparatus]

Figure 2A:
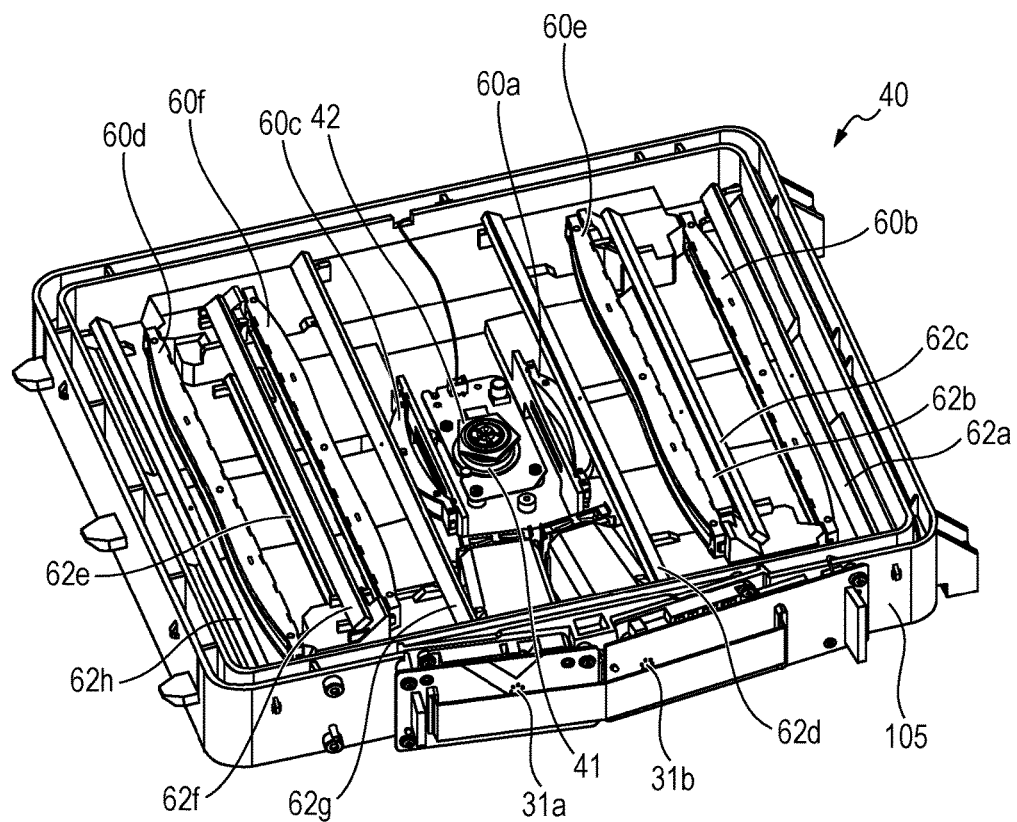
FIG. 2A is a perspective view of a light scanning apparatus of Embodiment 1.
Figure 9A:
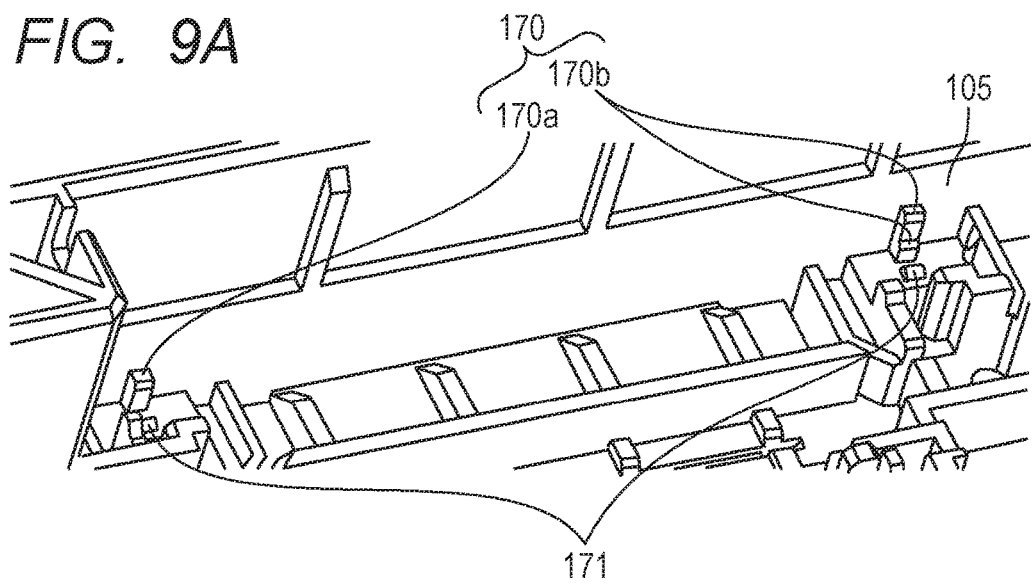
FIGS. 9A, 9B and 9C are views for describing a support structure of a general reflection mirror.
Figure 9B:
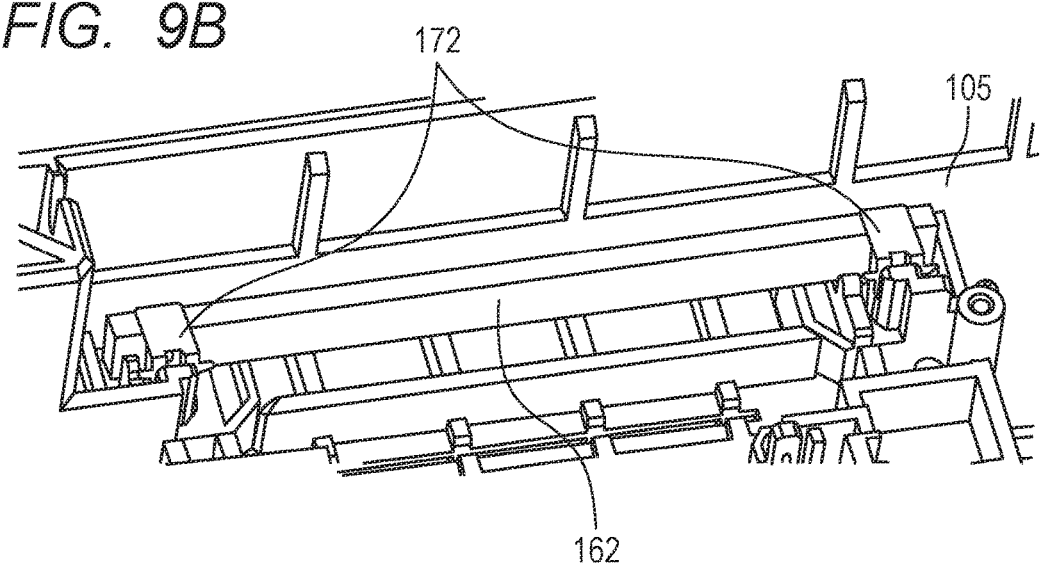
Figure 9C:
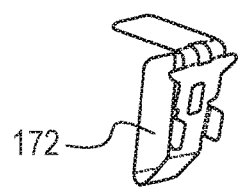

FIG. 2A is a perspective view for describing positions on which the reflection mirrors 62 (62a to 62h) and the optical lenses 60 (60a to 60f) that are optical members are placed, in a housing 105 (hereinafter also referred to as optical box 105). Incidentally, the light scanning apparatus 40 in FIG. 2A illustrates a state in which an upper lid 69 is removed from the housing 105 illustrated in FIG. 2B, and a state in which fixing springs for fixing the reflection mirrors 62 are removed. Light source units 31a and 31b that have each a light source mounted thereon which emits the light beam (laser light), a rotary polygon mirror 42 which deflects the light beam and the motor unit 41 are placed in the inside and the outer peripheral portion of the light scanning apparatus 40. Furthermore, in the light scanning apparatus 40, optical lenses 60a to 60f and reflection mirrors 62a to 62h are placed which guide the respective light beams to the photosensitive drums 50 to form images thereon. The reflection mirrors 62a to 62h illustrated in FIG. 2A correspond to the reflection mirror 162 in FIG. 9B. In addition, as is illustrated in FIG. 2A, in the inside of the housing 105, both ends in the longitudinal direction of each of the reflection mirrors 62a to 62h are fixed to the housing 105 by being pressed against a mirror supporting portion by a member such as an elastic member 172 illustrated in FIG. 9C, which will be described later.

Figure 2B:
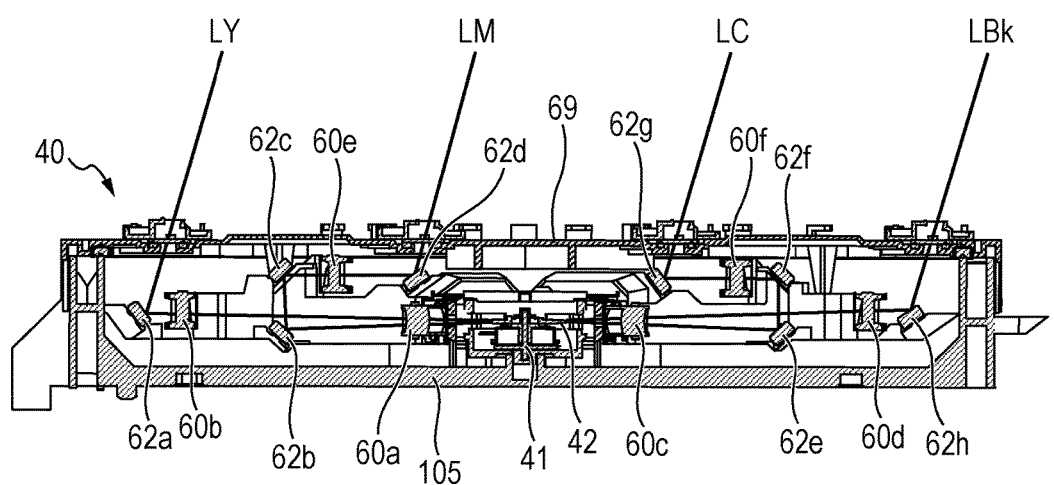
FIG. 2B is a cross-sectional view of the light scanning apparatus of Embodiment 1.

FIG. 2B is a schematic cross-sectional view illustrating the whole image of the light scanning apparatus 40 in which the optical elements are installed. A light beam LY corresponding to the photosensitive drum 50Y, which has been emitted from the light source unit 31b, is deflected by the rotary polygon mirror 42, and is incident on the optical lens 60a. The light beam LY that has passed through the optical lens 60a is incident on the optical lens 60b, passes through the optical lens 60b, and is then reflected by the reflection mirror 62a. The light beam LY reflected by the reflection mirror 62a passes through a transparent window, and scans the photosensitive drum 50Y.

The light beam LM corresponding to the photosensitive drum 50M, which has been emitted from the light source unit 31b, is deflected by the rotary polygon mirror 42, and is incident on the optical lens 60a. The light beam LM which has passed through the optical lens 60a is reflected by the reflection mirror 62b and the reflection mirror 62c, is incident on the optical lens 60e, passes through the optical lens 60e, and is then reflected by the reflection mirror 62d. The light beam LM which has been reflected by the reflection mirror 62d passes through the transparent window, and scans the photosensitive drum 50M.

The light beam LC corresponding to the photosensitive drum 50C, which has been emitted from the light source unit 31a, is deflected by the rotary polygon mirror 42, and is incident on the optical lens 60c. The light beam LC which has passed through the optical lens 60c is reflected by the reflection mirror 62e and the reflection mirror 62f, and is incident on the optical lens 60f; and the light beam LC which has passed through the optical lens 60f is reflected by the reflection mirror 62g. The light beam LC which has been reflected by the reflection mirror 62g passes through the transparent window, and scans the photosensitive drum 50C.

The light beam LBk corresponding to the photosensitive drum 50Bk, which has been emitted from the light source unit 31a, is deflected by the rotary polygon mirror 42, and is incident on the optical lens 60c. The light beam LBk which has passed through the optical lens 60c is incident on the optical lens 60d, passes through the optical lens 60d, and is then reflected by the reflection mirror 62h. The light beam LBk which has been reflected by the reflection mirror 62h passes through the transparent window, and scans the photosensitive drum 50Bk.

[Structure of Mirror Supporting Portion]

Figure 3A:
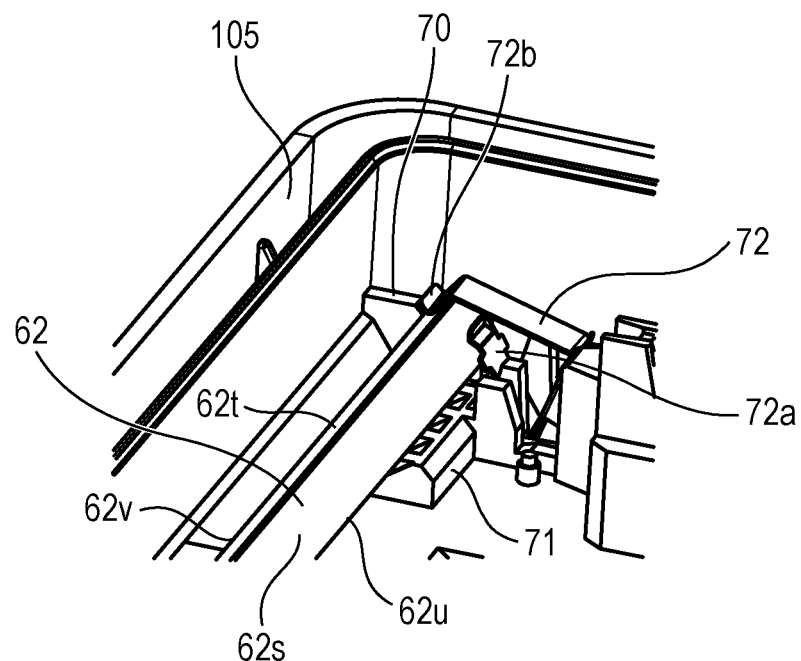
FIGS. 3A and 3B are schematic block diagrams for describing shapes of mirror supporting portions of the light scanning apparatus of Embodiment 1.
Figure 3B:
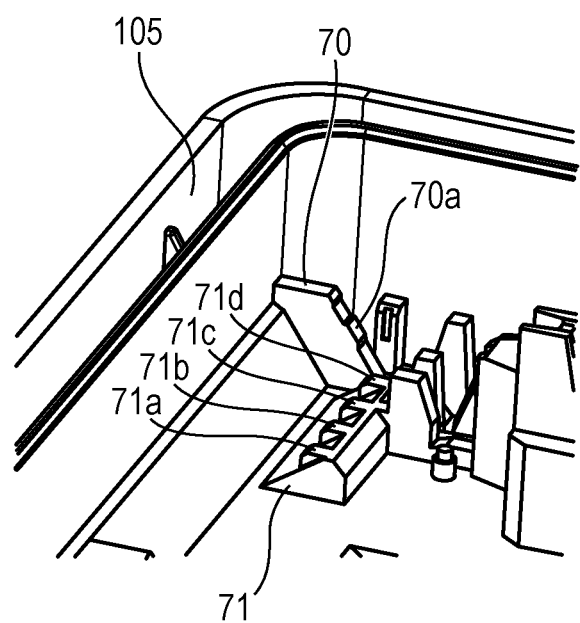

FIG. 3A and FIG. 3B are schematic block diagrams for describing the shapes of the mirror supporting portions 70 and 71 provided in the housing 105 of the light scanning apparatus 40 of the present Embodiment. FIG. 3A is a perspective view illustrating a state in which the reflection mirror 62 is placed on the mirror supporting portions 70 and 71, and the reflection mirror 62 is fixed to the mirror supporting portions 70 and 71 by a fixing spring 72. FIG. 3B is a perspective view illustrating the shapes of the mirror supporting portions 70 and 71, in which the reflection mirror 62 and the fixing spring 72 are removed from the state of FIG. 3A. A material made from a resin is used for the housing 105 of the light scanning apparatus 40, for reasons of improving the degree of freedom of a design shape, reducing the weight, shortening a manufacturing time period, and the like. In many cases, the housing 105 and the reflection mirror 62 have different coefficients of linear expansion from each other. Because of this, in order to minimize the influence at the time when the temperature has changed, the reflection mirror 62 is brought into contact with and is fixed to seating surfaces of the mirror supporting portions 70 and 71 provided in the housing 105, by a pressing force due to the fixing spring 72 which is the elastic member. In the present Embodiment, an example will be described below in which the seating surfaces of the mirror supporting portions 70 and 71 come in surface contact with the reflection mirror 62, but the mirror supporting portions 70 and 71 may be configured to support the reflection mirror 62 by point contact or line contact.

The fixing spring 72 illustrated in FIG. 3A has a first pressing portion 72a which pressurizes the reflection surface 62s of the reflection mirror 62, and a second pressing portion 72b which pressurizes a surface 62t of the upper part in the transverse direction perpendicular to the reflection surface of the reflection mirror 62. The first pressing portion 72a comes in contact with the reflection surface 62s of the reflection mirror 62, and pressurizes (biasing) the reflection mirror 62 toward a direction of the fixed seating surface of the mirror supporting portion 70. In addition, the second pressing portion 72b has such a shape that the end portion of the fixing spring 72 is bent, and is provided so as to prevent the reflection mirror 62 from falling off the mirror supporting portions 70 and 71. The second pressing portion 72b comes in contact with a surface 62t in the upper part of the reflection mirror 62, and pressurizes the reflection mirror 62 toward the transverse direction of the reflection mirror 62.

The mirror supporting portion 70 illustrated in FIG. 3B has a seating surface 70a provided thereon which supports the back surface 62v of the reflection surface 62s of the reflection mirror 62, when the reflection mirror 62 is placed. In addition, a mirror supporting portion 73 (see FIG. 7A and FIG. 7B which will be described later) is provided on the other end of the reflection mirror 62 in the longitudinal direction. The mirror supporting portion 73 has two seating surfaces 73a and 73b which support the back surface 62v of the reflection surface 62s of the reflection mirror 62 (see FIG. 7A and FIG. 7B). Thus, the seating surface which supports the back surface 62v of the reflection mirror 62 is provided at one portion in the mirror supporting portion 70 and at two portions in the mirror supporting portion 73, and these three seating surfaces in total are structured so as to support the back surface 62v of the reflection mirror 62. Thereby, the mirror supporting portions 70 and 73 which support the two ends in the longitudinal direction of the reflection mirror 62 can prevent the fixing spring 72 from ending up twisting the reflection mirror 62 by the force of pressurizing the reflection mirror 62 toward a direction perpendicular to the reflection surface 62s of the reflection mirror 62.

In addition, the mirror supporting portion 71 is provided at a position deviating from the mirror supporting portion 70 to the center side in the longitudinal direction of the reflection mirror 62 in such a way as to face the mirror supporting portion 70. The mirror supporting portion 71 supports the bottom surface 62u in the transverse direction of the reflection surface 62s of the reflection mirror 62. As is illustrated in FIG. 3B, the mirror supporting portion 71 has a plurality of protrusions 71a, 71b, 71c and 71d (four in the present Embodiment) each having a similar shape, and each of the protrusions has a seating surface that is an inclined contact surface with which the bottom surface 62u of the reflection mirror 62 comes in contact, when the reflection mirror 62 is placed. Incidentally, the mirror supporting portion 74 that has the similar shape to that of the mirror supporting portion 71 is provided also in the above described mirror supporting portion 73 side, at a position deviating from the mirror supporting portion 73 to the center side in the longitudinal direction of the reflection mirror 62, in such a way as to face the mirror supporting portion 73.

By the way, as has been described above, movable portions such as a paper conveying mechanism, the photosensitive drum 50 of the image forming portion and the intermediate transfer belt 20 are provided in the vicinity of the light scanning apparatus 40. The movable portions of the paper conveying mechanism and the image forming portion are formed of a motor which is a driving unit and each roller which is driven by the motor. Because of this, when the driving system which drives the movable portions works, vibration generated in the driving system propagates also to the light scanning apparatus 40 through the movable portions, and the reflection mirror vibrates. In the image forming apparatus, in a high-performance high-speed machine having a high printing speed, the driving frequency is high at which the driving system is driven, and in a low-speed machine having a low printing speed, the driving frequency is lower than that of the high-speed machine. Thus, the driving frequency changes according to the performance of the image forming apparatus, and accordingly the frequency of vibration generated in the driving system also changes according to the driving frequency. Because of this, in order to prevent the reflection mirror from resonating and vibrating, it is necessary to change also the natural frequency of the reflection mirror according to the vibration frequency. Then, among the four protrusions provided in the mirror supporting portions 71 and 74, one protrusion shall support the bottom surface 62u of the reflection mirror 62, which has been determined according to the performance of the image forming apparatus having the light scanning apparatus 40, and the rest three protrusions shall be subjected to melt processing which will be described later. In addition, in the present Embodiment, the mirror supporting portions 71 and 74 provided in both ends in the longitudinal direction of the reflection mirror 62 have each four protrusions. Because of this, the total number of protrusions is eight, which the two mirror supporting portions 71 and 74 have, but the number of protrusions which the two mirror supporting portions 71 and 74 have may be at least three or more protrusions in such a way that there is one protrusion in one mirror supporting portion and there are two protrusions in the other mirror supporting portion.

[Assembly of Light Scanning Apparatus]

FIG. 4 is a flowchart illustrating an operation flow for assembling the light scanning apparatus 40 that is mounted in the image forming apparatus, according to the performance (for instance, operation speed and the like) of the image forming apparatus. In the present Embodiment, the light scanning apparatus 40 is assembled, processed and adjusted in line with the operation flow illustrated in FIG. 4, according to the performance of the image forming apparatus. In the present embodiment, the natural frequency of the reflection mirror 62 to be placed is controlled by an operation of selecting a protrusion which is not subjected to the melt processing, in the mirror supporting portions 71 and 74, according to the performance (the number of printed sheets per unit time) of the image forming apparatus in which the light scanning apparatus 40 is mounted.

In FIG. 4, in a step (hereinafter referred to as S) 1, a housing 105 of a light scanning apparatus 40 to be assembled is prepared. The housing 105 of the light scanning apparatus 40 is manufactured by an injection molding machine. The housing 105 of the light scanning apparatus 40, which has been manufactured by the injection molding machine, is the housing 105 in a state as illustrated in FIG. 3B, and the mirror supporting portions 71 and 74 are in such a state as to have each four protrusions provided therein.

In S2, an identification label corresponding to the performance of the image forming apparatus in which the light scanning apparatus 40 is mounted is stuck to the light scanning apparatus 40. In the image forming apparatus of the present embodiment, products are arranged which have different performances according to the request of the user. As for the printing speed, for instance, a product line is configured so as to be capable of responding to the request of the user, which includes image forming apparatuses that can print from 30 sheets per minute to print 60 sheets per minute and products that can print further a larger number of sheets or fewer number of sheets than those. In the light scanning apparatus 40 of the present embodiment, in order to respond to the image forming apparatuses having different performances by using one type of housing 105, the identification label according to the corresponding image forming apparatus is stuck to the image forming apparatus so that the type of light scanning apparatus 40 can be understood when viewed from the outside. Incidentally, here, the identification label is stuck, but the identification information that is written on the identification label, for instance, may be directly printed on the housing of the light scanning apparatus 40.

In S3, in order to perform the melt processing on the protrusions of the mirror supporting portions 71 and 74, the housing 105 of the light scanning apparatus 40 is placed on the seating surface processing machine. The seating surface processing machine of the present embodiment has a high-temperature ironing portion, controls the ironing position based on position information on the protrusion to be melted of the mirror supporting portions 71 and 74, presses the ironing portion against the surface of the protrusion, and thereby deforms the shape of the protrusion.

In S4, the seating surface processing machine reads out the identification label stuck on the housing 105, and acquires melt processing information on the protrusions of the mirror supporting portions 71 and 74, which corresponds to the identification information of the read out identification label and is previously stored in the seating surface processing machine. Incidentally, in the melt processing information, the position information of the protrusion shall be set that is subjected to melt processing, out of four protrusions of the mirror supporting portions 71 and 74 which support each of the reflection mirrors 62 provided in the housing 105. The protrusion to be subjected to the melt processing is selected so that an image defect does not occur by such a cause that the natural frequency of the reflection mirror 62 matches the frequency of the vibration or the like, which is generated in the driving source of the image forming apparatus, according to the identification label. In addition, because the reflection mirrors 62 have different vibration modes and natural frequencies, respectively, the protrusion to be subjected to the melt processing are selected so that a span D between the seating surfaces of the protrusions also varies which are not subjected to the melt processing, in the mirror supporting portions 71 and 74, and are deformed by melt processing.

In S5, the seating surface processing machine presses the high-temperature ironing portion against the surfaces of the protrusions of the corresponding mirror supporting portions 71 and 74, based on the position information on the protrusions that are subjected to the melt processing, which has been acquired in S4, and performs the melt processing. Thereby, the seating surface processing machine melts and deforms the surfaces of the protrusions, and can retract the protrusions down to positions at which the seating surfaces provided on the protrusions do not come in contact with the bottom surface 62u of the reflection mirror 62. In the present embodiment, the surfaces of the protrusions may be retracted by heat of the ironing portion to the positions that are detached from the bottom surface 62u of the reflection mirror 62, even by, for instance, such an amount as 0.1 mm, compared to the seating surface of the protrusion which is left for supporting the bottom surface 62u of the reflection mirror 62. Because of this, the operation for the melt processing in S5 can be finished in a short period of time.

Figure 5A:
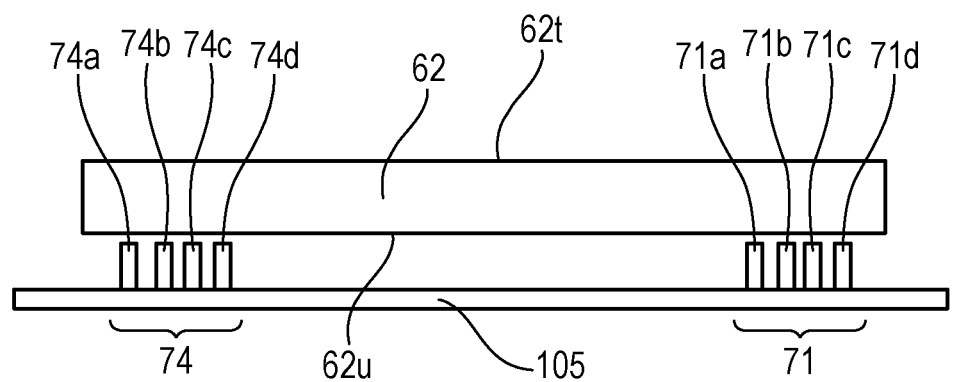
FIGS. 5A and 5B are schematic block diagrams for describing the shapes of the mirror supporting portions of the light scanning apparatus of Embodiment 1.
Figure 5B:
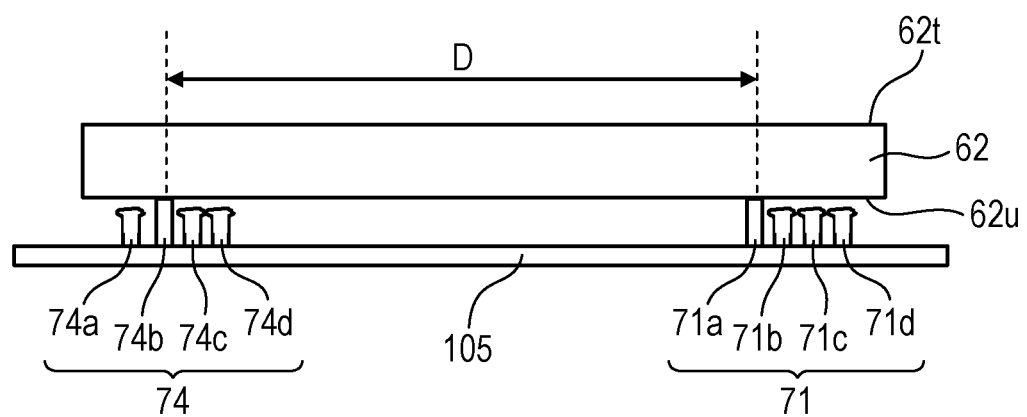

FIGS. 5A and 5B are schematic views for describing the above described operation content of S5. FIG. 5A is a schematic view illustrating the perspective view of FIG. 3B in the longitudinal direction of the reflection mirror 62, and is a view illustrating a positional relationship between the reflection mirror 62 and the mirror supporting portions 71 and 74. Protrusions 71a to 71d and 74a to 74d provided so as to erect from the housing 105 are provided on the mirror supporting portions 71 and 74, respectively, and a groove into which a material resin (for instance, resin used in housing 105) of the protrusion that has been melted by a high-temperature ironing portion flows is provided between each of the protrusions. In addition, FIG. 5B is a schematic view illustrating a state in which the reflection mirror 62 has been placed on the seating surfaces remaining after the melt processing of the protrusions of the mirror supporting portions 71 and 74 by the processing treatment in S5. In the mirror supporting portion 71, the melt processing is performed on the protrusions 71b, 71c and 71d by the seating surface processing machine, and in the mirror supporting portion 74, the melt processing is performed on the protrusions 74a, 74c and 74d. As a result, the bottom surface 62u of the reflection mirror 62 is supported by the seating surface of the protrusion 71a of the mirror supporting portion 71 and the seating surface of the protrusion 74b of the mirror supporting portion 74, and does not come in contact with other protrusions which have been subjected to the melt processing. In addition, the span D illustrated in FIG. 5B shows a distance in the longitudinal direction of the reflection mirror 62 between the protrusion 71a and the protrusion 74b with which the bottom surface 62u of the reflection mirror 62 comes in contact. As has been described above, the natural frequency of the reflection mirror 62 varies according to the distance of the span D.

In S6, the operation by the seating surface processing machine is performed on all of the mirror supporting portions on which the reflection mirror 62 is placed, and it is determined whether or not the operation has been completed; and when it has been determined that the operation has not been completed, the process is returned to S5, and when it has been determined that the operation has been completed, the process progresses to S7.

In step S7, such operations are performed as to place, fix and adjust the optical member and the like in the inside of the housing 105 of the light scanning apparatus 40, such as the rotary polygon mirror 42 and the optical lenses 60 (60a to 60f) including the reflection mirrors 62 (62a to 62h). In S8, in order to test the light scanning apparatus 40 in which the assembly of the optical member and the like have been completed, the light scanning apparatus 40 is driven and the characteristic values are measured such as a light-condensing state of the light beam, and it is checked that the measured characteristic value is settled in the standard of the light scanning apparatus 40. Then, the operation is finished.

Incidentally, the above described processing by the seating surface processing machine has been the melt processing by an operation of pressing the high-temperature ironing portion against the surface of the protrusion. The processing method may not be the above described melt processing by heat, but may be, for instance, such a processing method as to break and remove the protrusion by cutting the seating surfaces of the protrusions of the unnecessary mirror supporting portions 71 and 74 by a cutting member, or twisting the protrusion while sandwiching the protrusion with a jig or the like. Incidentally, there is a possibility that in the processing by the cutting member, the cut powder may remain in the inside of the housing 105, and accordingly in the present embodiment, it is recommended to melt by heat.

As has been described above, in the present embodiment, the mirror supporting portions 71 and 74 which support the bottom surface 62u of the reflection mirror 62 are structured so as to be capable of changing (selectable) the span D between the protrusions thereof, according to the length of each of the reflection mirrors 62, the shape around each of the mirror supporting portions, and the speed of the image forming apparatus. Thereby, the structure can change the natural frequency of the reflection mirror 62 and shift the natural frequency from the frequency of the vibration generated in the driving system of the image forming apparatus, which is the vibration source; accordingly can prevent the vibration of the reflection mirror 62; and can prevent the deterioration in the image quality. Furthermore, in the present embodiment, a plurality of selectable protrusions each having a seating surface are provided in the housing 105 beforehand, and besides, unnecessary protrusions are removed. Because of this, compared to a conventional light scanning apparatus that moves another member which supports the reflection mirror and fixes the member to the housing 105, the present light scanning apparatus can prevent an occurrence of such problems that the natural frequency ends up deviating from the predetermined frequency due to a fine change such as a placement situation of the another member and that the reflection mirror resonates with the vibration source and causes an image defect.

In addition, the plurality of selectable protrusions of the mirror supporting portions 71 and 74 of the present embodiment have shapes of the seating surfaces which are formed in the housing 105 beforehand, and accordingly are discretely disposed. The printing speed patterns according to the performance of the image forming apparatus are also discrete, and accordingly an effect can be obtained by an operation of controlling the natural frequency of the reflection mirror 62, which is a discrete frequency, so as not to resonate with a discrete frequency of the vibration generated by the driving system that is the vibration source. Incidentally, when fine adjustment of the natural frequency of the reflection mirror 62 is desired, it is acceptable to adopt a method of providing a long rib-shaped seating surface having the same length as the longitudinal direction of the reflection mirror 62, at a position facing the reflection mirror 62, instead of the above described discretely disposed mirror supporting portions 71 and 74; and by cutting the long rib-shaped seating surface with a cutting tool, providing seating surfaces that support the bottom surface 62u of the reflection mirror 62, at positions separated just by such a distance of the span D that the natural frequency of the reflection mirror 62 becomes a predetermined frequency.

Incidentally, in the present embodiment, the light scanning apparatus has been illustrated in which a plurality of protrusions are separately provided at positions corresponding to one end side of the reflection mirror and positions corresponding to the other end side in the longitudinal direction of the reflection mirror, respectively, but the present embodiment is not limited to the light scanning apparatus. For instance, it is also acceptable to provide a plurality of protrusions on either one of the position corresponding to one end side of the reflection mirror and the position corresponding to the other end side, and to provide one protrusion as the support portion on the side on which the plurality of protrusions are not provided. In this case, the span D is adjusted by an operation of subjecting the protrusion which is not used for supporting the reflection mirror 62 among the plurality of protrusions, to the above described processing.

[Relationship Between Seating Surface Position of Mirror Supporting Portion and Natural Frequency of Reflection Mirror]

Figure 6:
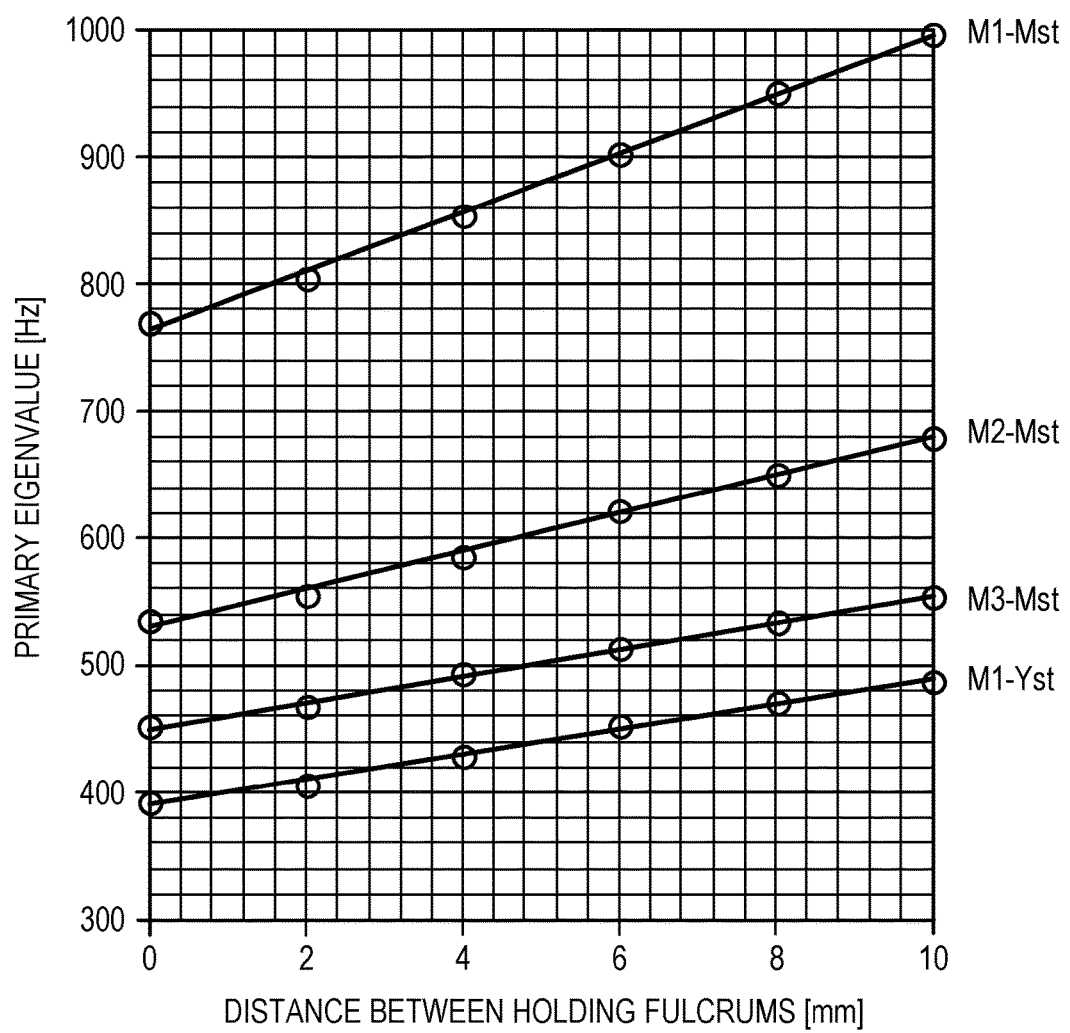
FIG. 6 is a graph showing a relationship between a distance between the mirror supporting portions and a frequency of the mirror of Embodiment 1.

FIG. 6 is a graph illustrating a result that has been obtained by measuring the vibration characteristics of the reflection mirror 62 which has been placed in the light scanning apparatus 40, by using the structure of the light scanning apparatus 40 of the present embodiment. The vertical axis represents a primary eigenvalue (Hz) that is the natural frequency of the reflection mirror 62, and the horizontal axis represents a distance between holding fulcrums (mm), which is a distance obtained by shortening the distance between the seating surfaces of the protrusions of the mirror supporting portions 71 and 74 that support the bottom surface 62u of the reflection mirror 62. In FIG. 5A, the meaning that the distance between the holding fulcrums is 0 mm refers to the case in which the protrusions of the mirror supporting portions 71 and 74 that support the bottom surface 62u of the reflection mirror 62 are 71d and 74a, respectively, in other words, refers to the case in which the span D is largest. As the protrusion of the mirror supporting portion 71 which supports the bottom surface 62u of the reflection mirror 62 moves from 71d to 71c, 71b and 71a, and similarly, the protrusion of the mirror supporting portion 74 moves from 74a to 74b, 74c and 74d, the distance between the holding fulcrums, in other words, the shortened distance increases. In addition, as the distance between the holding fulcrums increases, the span D decreases.

In addition, M1-Yst illustrated on the right side of FIG. 6 indicates a graph of the natural frequency of the reflection mirror 62 that is placed at a position (62a in FIG. 2A) of M1 (mirror 1) of the optical path of the laser light LY which scans a photosensitive drum 50Y of an image forming portion (Yst) of yellow. M1-Mst, M2-Mst and M3-Mst indicate graphs of the natural frequencies of the reflection mirrors 62 that are placed, respectively at the positions of M1 (mirror 1), M2 (mirror 2) and M3 (mirror 3) of the optical path of the laser light LM which scans the photosensitive drum 50M of the image forming portion (Mst) of magenta. Incidentally, the circle in the graph shows the measured value. In any of the graphs shown in FIG. 6, when the distance between the holding fulcrums changes, the primary eigenvalue also thereby changes which shows the natural frequency of the reflection mirror 62. It is understood that as the distance between the holding fulcrums increases, in other words, as the span D decreases, the primary eigenvalue of the reflection mirror 62 increases, in other words, the natural frequency of the reflection mirror 62 becomes high. Because of this, by adopting such a structure as to select the seating surface of the protrusion which supports the bottom surface 62u of the reflection mirror 62 described in the present embodiment, the natural frequency of the reflection mirror 62 can be changed with high accuracy.

As has been described above, according to the present embodiment, the natural frequency of the reflection mirror can be adjusted by a simple structure. The light scanning apparatus of the present embodiment can change (selectable) the span between the supporting seating surfaces that support the reflection mirror, according to the frequency of the vibration generated by the driving system which is the vibration source and determines the performance of the image forming apparatus in which the housing is mounted. Thereby, it is enabled to stably shift the natural frequency of the mirror, from the frequency of the vibration generated by the driving source which is mounted on the image forming apparatus.

Incidentally, in the present embodiment, an example has been shown in which the protrusions 71a, 71b, 71c and 71d and the protrusions 74a, 74b, 74c and 74d are provided on one end side and the other end side of the reflection mirror 62, respectively. For instance, it is also acceptable to provide a plurality of protrusions 71a, 71b, 71c and 71d on the support portion (first support portion) on one end side of the reflection mirror 62, and to provide only one protrusion on the support portion (second support portion) on the other end side. In the case of such an optical box, in the plurality of protrusions 71a, 71b, 71c and 71d that are provided on one end side of the reflection mirror 62, the protrusions which are not used for supporting the reflection mirror 62 are processed so as to not come into contact with the reflection mirror. In addition, one support portion (one protrusion) on the other end side is not processed.

Embodiment 2

In Embodiment 1, the processing by heat melt has been recommended so that the cut powder is not formed when the seating surfaces of the mirror supporting portions 71 and 74 are subjected to processing, but even by the melt, there is a possibility that a fine material of the housing 105 falls off. A part of the material constituting the molten housing 105 is pushed out to the periphery of the seating surface, and accordingly tends to become a so-called burr shape. If a hand of an operator or an optical member of the reflection mirror and the like touches the burr shape portion, the burr shape portion occasionally falls off and remains in the inside of the housing 105. As a result, such fine dust which has not been removed and remained when the housing 105 has been cleaned ends up moving to a passage region of the light beam in the inside of the housing 105 of the light scanning apparatus 40, in a distribution process of conveying the image forming apparatus, and occasionally causes such an image defect that streaks or the like are formed in the image. In Embodiment 2, the structure of the protrusions of the mirror supporting portions 71 and 74 which prevent such an image defect will be described. Incidentally, in the present embodiment, the structures of the printer which is the image forming apparatus and the light scanning apparatus 40 except the mirror supporting portions 71 and 74 are similar to those in Embodiment 1, and the description will be omitted here by using the same reference numerals for the same components.

[Structure of Mirror Supporting Portion]

Figure 7A:
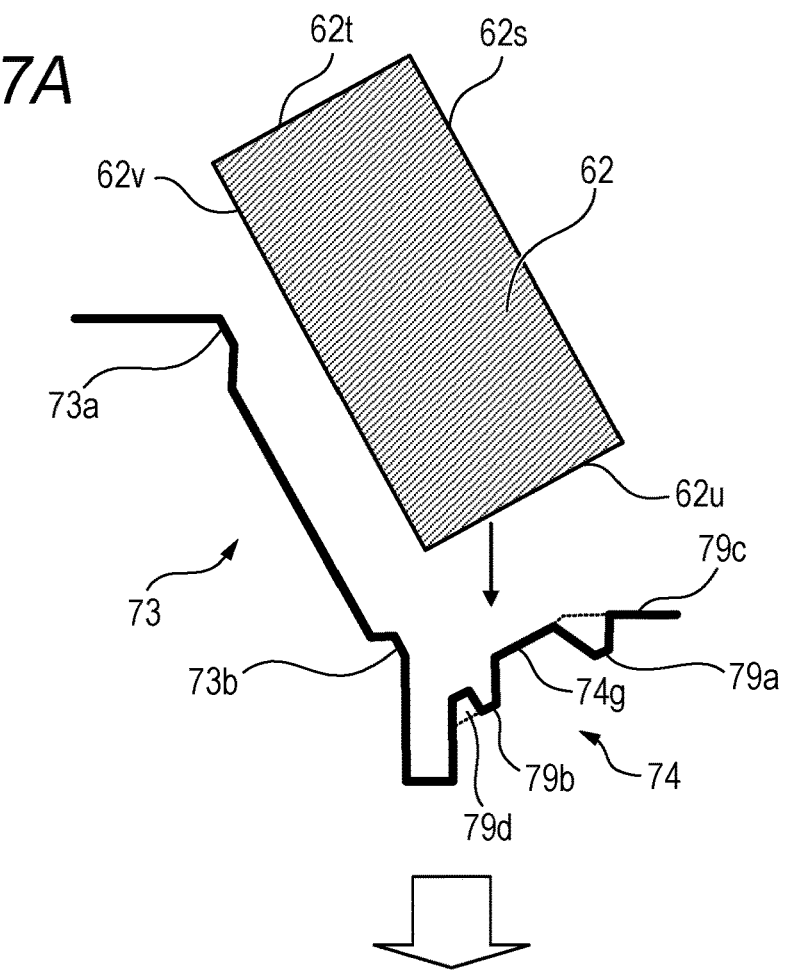
FIGS. 7A and 7B are schematic block diagrams for describing a shape of a mirror supporting portion of a light scanning apparatus of Embodiment 2.
Figure 7B:
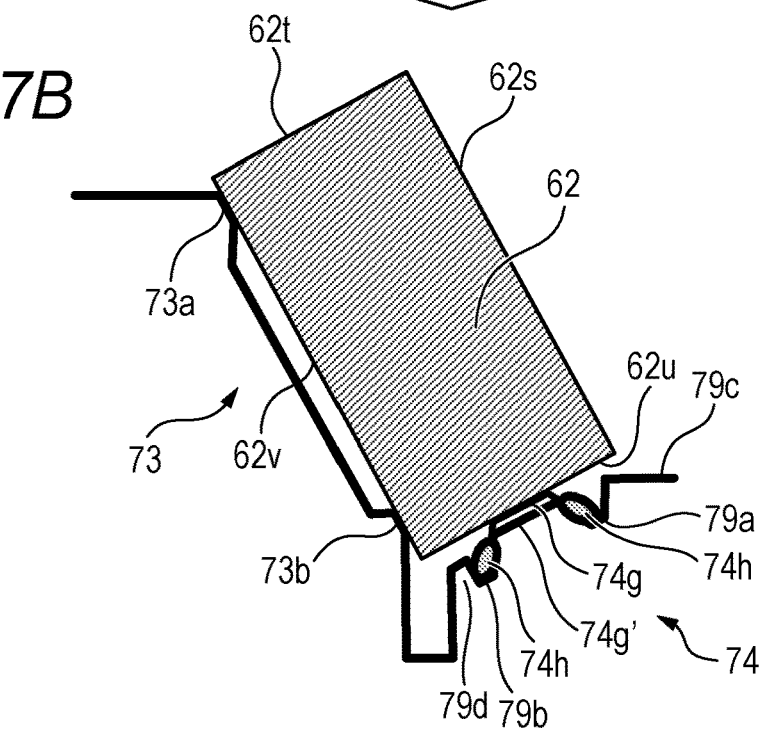

FIGS. 7A and 7B are schematic views illustrating schematic cross sections of the mirror supporting portions 73 and 74 for describing the structure of the mirror supporting portion 74 of the present embodiment. FIG. 7A is a schematic view illustrating the positional relationship between the reflection mirror 62 and the mirror supporting portions 73 and 74. While the mirror supporting portion 70 has only the seating surface 70a which supports the back surface 62v of the reflection mirror 62 (FIG. 3B), the mirror supporting portion 73 has two seating surfaces 73a and 73b, as is illustrated in FIG. 7A. In addition, in the mirror supporting portion 74, groove portions 79a and 79b into which the molten material flows are provided on both sides in the transverse direction of the bottom surface 62u of a seating surface 74g with which the bottom surface 62u of the reflection mirror 62 comes in contact. Incidentally, a dotted line portion drawn in the periphery of the seating surface 74g shows the shape of the mirror supporting portion 74 in Embodiment 1, in order to show a difference in the shape from the mirror supporting portion 74 of Embodiment 2. In the mirror supporting portion 74 of Embodiment 2, the groove portions 79a and 79b are provided on both sides of the seating surface 74g in the transverse direction of the bottom surface 62u, and furthermore, protrusions 79c and 79d for forming the groove portions 79a and 79b are provided on the respective sides of the groove portions 79a and 79b, which face the seating surface 74g. Incidentally, the protrusions 79c and 79d are provided at positions in which the bottom surface 62u does not come in contact with the protrusions 79c and 79d, when the bottom surface 62u of the reflection mirror 62 has come in contact with the seating surface 74g.

FIG. 7B is a schematic view illustrating a cross section in a state in which the reflection mirror 62 is brought into contact with the mirror supporting portions 73 and 74. The back surface 62v of the reflection mirror 62 is supported by the seating surfaces 73a and 73b of the mirror supporting portion 73. The bottom surface 62u of the reflection mirror 62 is supported by the seating surface 74g of the protrusion which has been provided on the back side of the mirror supporting portion 74 in FIG. 7B. On the other hand, the seating surface 74g' of the protrusion on the front side in FIG. 7B shows a state in which the molten resin 74h that has been melted due to the melt processing by the seating surface processing machine flows into the grooves 79a and 79b. Due to the thus structured mirror supporting portion 74, a part (burr shape portion) 74h of the material of the seating surface 74g, which has been melted and deformed, is accommodated in the groove portions 79a and 79b. Specifically, the burr shape portion 74h which has been melted and deformed during the melt processing operation does not end up being touched, and the problem of an image defect due to the burr shape portion can be avoided. Incidentally, FIGS. 7A and 7B are schematic views illustrating the mirror supporting portions 73 and 74, but the mirror supporting portion 71 which supports the other end in the longitudinal direction of the reflection mirror also has a similar structure to that of the above described mirror supporting portion 74.

As has been described above, according to the present embodiment, the natural frequency of the reflection mirror can be adjusted by a simple structure. In particular, due to the groove portions provided in the periphery of the seating surface, the material melted by the melt processing flows into the groove portions. Because of this, it can be avoided that the burr shape dust which has fallen off stays in the housing of the light scanning apparatus by the reason that something touches the melted and deformed burr shape portion. As a result, it is prevented that the burr shape dust shields the light beam and thereby such an image defect occurs that streaks or the like are formed in the image.

Embodiment 3

In Embodiments 1 and 2, the structure has been described in which a protrusion except the selected protrusion out of the plurality of protrusions which are provided in the mirror supporting portion that supports the bottom surface of the reflection mirror is subjected to the melt processing by the seating surface processing machine, and thereby only the seating surface of the selected protrusion supports the bottom surface of the reflection mirror. In the present embodiment, a structure will be described in which the protrusion is not subjected to the melt processing by the seating surface processing machine, an adhesive is applied to the seating surface of the selected protrusion, and thereby the selected protrusion supports the reflection mirror.

[Structure of Mirror Supporting Portion]

Figure 8A:
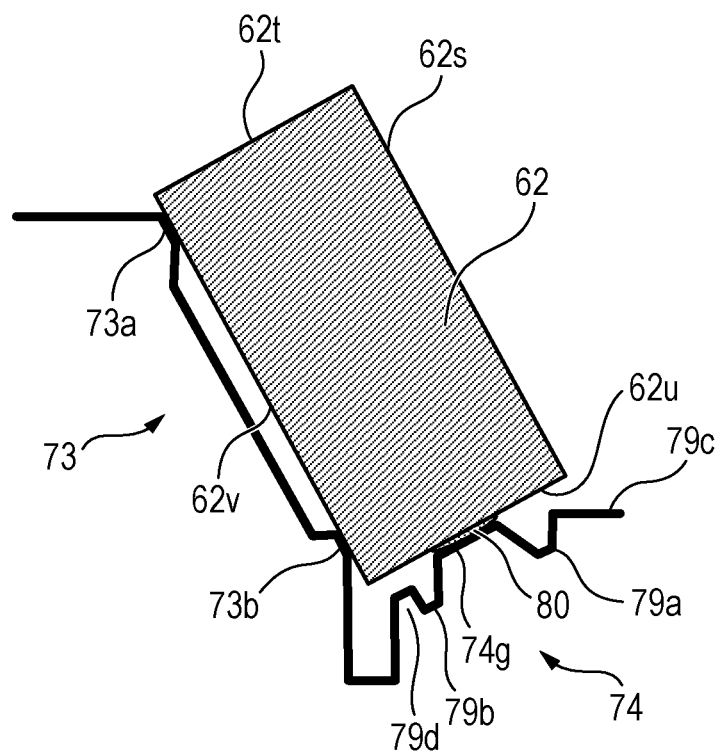
FIGS. 8A and 8B are schematic block diagrams for describing a shape of a mirror supporting portion of a light scanning apparatus of Embodiment 3.
Figure 8B:
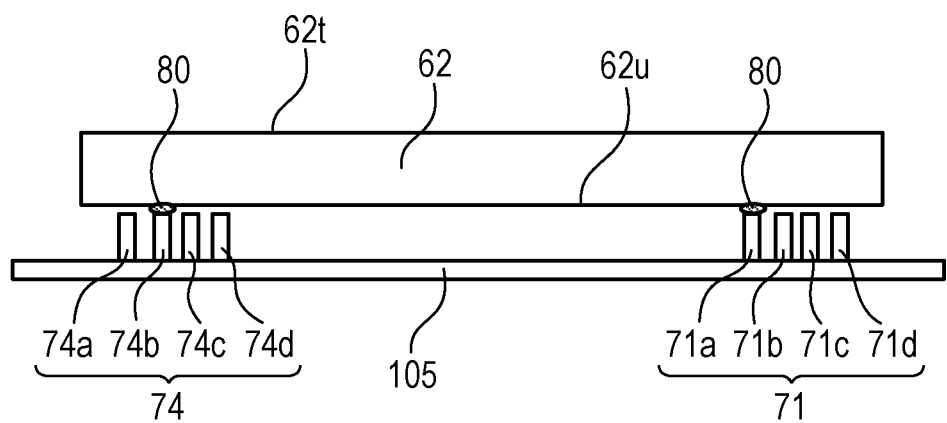

FIG. 8A is a schematic view illustrating a cross section in a state in which the reflection mirror 62 is brought into contact with the mirror supporting portions 73 and 74. The back surface 62v of the reflection mirror 62 is supported by two seating surfaces 73a and 73b of the mirror supporting portion 73. In addition, the bottom surface 62u of the reflection mirror 62 is supported by the seating surface of the mirror supporting portion 74 through an adhesive 80. FIG. 8B is a schematic view illustrating a positional relationship in the longitudinal direction of the reflection mirror 62, between the reflection mirror 62 and the mirror supporting portions 71 and 74. In FIG. 8B, the protrusions 74a, 74c and 74d of the mirror supporting portion 74 are not subjected to the melt processing, and the adhesive 80 is applied to the protrusion 74b. Similarly, in FIG. 8B, the protrusions 71b, 71c and 71d of the mirror supporting portion 71 are not subjected to the melt processing, and the adhesive 80 is applied to the protrusion 71a in a step of applying the adhesive. In the present embodiment, each of the protrusions of the mirror supporting portions 71 and 74 are not subjected to the melt processing by the seating surface processing machine, but the adhesive 80 is applied to the seating surface of the protrusion which supports the bottom surface 62u of the reflection mirror 62, and thereby the supporting protrusion supports the bottom surface 62u. By the adhesive 80 applied to the seating surface, a region corresponding to the thickness of the adhesive 80 is formed between the seating surface on which the adhesive 80 has been applied and the bottom surface 62u of the reflection mirror 62. Specifically, the applied adhesive acts as a spacer, and gaps are formed between the bottom surface 62u of the reflection mirror 62 and the respective seating surfaces of the protrusions of the mirror supporting portions 71 and 74, onto which the adhesive has not been applied, and the seating surfaces of the protrusions do not come in contact with the bottom surface 62u of the reflection mirror 62. Incidentally, it is acceptable to structure the mirror supporting portion so as to put a member like a plate member other than the adhesive on the seating surface which is used for supporting the reflection mirror 62, and to fix the reflection mirror to the optical box by a plate spring.

In addition, the adhesive which is used in the present embodiment is an ultraviolet curable type of adhesive. This is because it is enabled to utilize the reflection mirror 62 that is supported by the seating surface to which the adhesive is applied, as a light guide, and to irradiate the adhesive with ultraviolet light, and accordingly the structure can be created which can show a similar effect to those in Embodiments 1 and 2, in a short period of time.

As has been described above, according to the present embodiment, the natural frequency of the reflection mirror can be adjusted by a simple structure. According to the present embodiment, it is enabled to stably change the natural frequency of the mirror to the predetermined frequency, similarly to the above described Embodiments 1 and 2. Furthermore, the processing is not applied to the housing of the light scanning apparatus, and also fine dust to be formed during the processing can be prevented from being formed. In addition, the reflection mirror placed on the upper part of the seating surface can be utilized as the light guide, and the natural frequency can be surely changed in a short period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025990, filed Feb. 15, 2017, which is hereby incorporated by reference herein in its entirety.

What is claimed is:

1. A method of manufacturing a light scanning apparatus to be mounted in an image forming apparatus, the light scanning apparatus comprising a light source, a rotary polygon mirror configured to deflect a light beam emitted from the light source, a reflection mirror configured to guide the light beam deflected by the rotary polygon mirror onto a photosensitive member, and an optical box to which the light source, the rotary polygon mirror and the reflection mirror are attached, the method comprising:

forming the optical box, wherein the optical box which is formed by the forming has a plurality of protrusions configured to support the reflection mirror, the plurality of protrusions being arranged along a longitudinal direction of the reflection mirror which is to be attached to the optical box, wherein the plurality of protrusions are provided at positions corresponding to one end side of the reflection mirror in the longitudinal direction of the reflection mirror which is to be attached to the optical box and positions corresponding to the other end side of the reflection mirror, respectively, and wherein the plurality of protrusions are formed on the optical box so that surfaces of all the plurality of protrusions on a side supporting the reflection mirror are located on a same plane;

selecting a plurality of protrusions to be used for supporting the reflection mirror, based on information about a number of printable sheets per unit time of the image forming apparatus in which the optical box is to be mounted, by selecting at least one from each of the plurality of protrusions disposed on the one end side of the refection mirror which is to be attached to the optical box and the plurality of protrusions disposed on the other end side of the refection mirror which is to be attached to the optical box;

processing protrusions except the plurality of protrusions that are selected by the selecting so that a protrusion except the at least one protrusion that is selected by the selecting from among the plurality of protrusions disposed on the one end side of the reflection mirror which is to be attached to the optical box is out of contact with the reflection mirror, and so that a protrusion except the at least one protrusion that is selected by the selecting from among the plurality of protrusions disposed on the other end side of the reflection mirror which is to be attached to the optical box is out of contact with the reflection mirror;

placing the reflection mirror on the protrusions that have not been processed in the processing; and fixing the reflection mirror, which has been placed on the protrusions that have not been processed in the placing, to the optical box.

2. The method according to claim 1, wherein the processing comprises melting the protrusions except the protrusions that are used for supporting the reflection mirror.

3. The method according to claim 2, wherein a groove is provided around each of the plurality of protrusions of the optical box which is formed by the forming.

4. The method according to claim 1, wherein the processing comprises cutting the protrusions except the protrusions that are used for supporting the reflection mirror.

5. The method according to claim 1, wherein a number of the protrusions to be selected by the selecting is two.

6. The method according to claim 1, wherein the optical box has the information about the number of printable sheets per unit time of the image forming apparatus.

7. The method according to claim 6, wherein the information about the number of printable sheets per unit time of the image forming apparatus is stuck to the optical box as an identification label.

8. An image forming apparatus comprising a light scanning apparatus, the light scanning apparatus comprising:
a light source;
a rotary polygon mirror configured to deflect a light beam emitted from the light source;
a reflection mirror configured to guide the light beam deflected by the rotary polygon mirror onto a photosensitive member; and
an optical box to which the light source, the rotary polygon mirror, and the reflection mirror are attached,
the light scanning apparatus being manufactured by a manufacturing method, comprising:
forming the optical box,
wherein the optical box which is formed by the forming has a plurality of protrusions configured to support the reflection mirror, the plurality of protrusions being arranged along a longitudinal direction of the reflection mirror which is to be attached to the optical box, wherein the plurality of protrusions are provided at positions corresponding to one end side of the reflection mirror in the longitudinal direction of the reflection mirror which is to be attached to the optical box and positions corresponding to the other end side of the reflection mirror, respectively, and wherein the plurality of protrusions are formed on the optical box so that surfaces of all the plurality of protrusions on a side supporting the reflection mirror are located on a same plane;

selecting a plurality of protrusions to be used for supporting the reflection mirror, based on information about a number of printable sheets per unit time of the image forming apparatus in which the optical box is to be mounted, by selecting at least one from each of the plurality of protrusions disposed on the one end side of the refection mirror which is to be attached to the optical box and the plurality of protrusions disposed on the other end side of the refection mirror which is to be attached to the optical box;

processing protrusions except the plurality of protrusions that are selected by the selecting so that a protrusion except the at least one protrusion that is selected by the selecting from among the plurality of protrusions disposed on the one end side of the reflection mirror which is to be attached to the optical box is out of contact with the reflection mirror, and so that a protrusion except the at least one protrusion that is selected by the selecting from among the plurality of protrusions disposed on the other end side of the reflection mirror which is to be attached to the optical box is out of contact with the reflection mirror;

placing the reflection mirror on the protrusions that have not been processed in the processing; and fixing the reflection mirror, which has been placed on the protrusions that have not been processed in the placing, to the optical box.

9. The image forming apparatus according to claim 8, wherein the processing comprises melting the protrusions except the protrusions that are used for supporting the reflection mirror.

10. The image forming apparatus according to claim 9, wherein a groove is provided around each of the plurality of protrusions of the optical box which is formed by the forming.

11. The image forming apparatus according to claim 8, wherein the processing comprises cutting the protrusions except the protrusions that are used for supporting the reflection mirror.

12. The image forming apparatus according to claim 8, wherein a number of the protrusions to be selected by the selecting is two.

13. The image forming apparatus according to claim 8, wherein the optical box has the information about the number of printable sheets per unit time of the image forming apparatus.

14. The image forming apparatus according to claim 13, wherein the information about the number of printable sheets per unit time of the image forming apparatus is stuck to the optical box as an identification label.

15. A method of manufacturing a light scanning apparatus to be mounted in an image forming apparatus, the light scanning apparatus comprising a light source, a rotary polygon mirror configured to deflect a light beam emitted from the light source, a reflection mirror configured to guide the light beam deflected by the rotary polygon mirror onto a photosensitive member, and an optical box to which the light source, the rotary polygon mirror and the reflection mirror are attached, the method comprising:
   forming the optical box,
      wherein the optical box which is formed by the forming has a plurality of protrusions configured to support the reflection mirror, the plurality of protrusions being arranged along a longitudinal direction of the reflection mirror at positions corresponding to one end side of the reflection mirror in the longitudinal direction of the reflection mirror which is to be attached to the optical box, and has a support portion disposed at a position corresponding to the other end side of the reflection mirror, and
      wherein the support portion and the plurality of protrusions are formed on the optical box so that a surface of the support portion and surfaces of all the plurality of protrusions on a side supporting the reflection mirror are located on a same plane;
   selecting a protrusion to be used for supporting the reflection mirror from among the plurality of protrusions based on information about a number of printable sheets per unit time of the image forming apparatus in which the optical box is to be mounted;
   processing a protrusion except at least one protrusion that is selected by the selecting so that the protrusion except the at least one protrusion that is selected by the selecting from among the plurality of protrusions disposed on the one end side of the reflection mirror which is to be attached to the optical box is out of contact with the reflection mirror;
   placing the reflection mirror on the at least one protrusion that has not been processed in the processing and the support portion; and
   fixing the reflection mirror, which has been placed on the at least one protrusion that has not been processed and the support portion in the placing, to the optical box.

16. The method according to claim 15, wherein the processing comprises melting the protrusion except the protrusion that is used for supporting the reflection mirror.

17. The method according to claim 16, wherein a groove is provided around each of the plurality of protrusions of the optical box which is formed by the forming.

18. The method according to claim 15, wherein the processing comprises cutting the protrusion except the protrusion that is used for supporting the reflection mirror.

19. The method according to claim 15, wherein a number of the protrusions to be selected by the selecting is one.

20. The method according to claim 15, wherein the optical box has the information about the number of printable sheets per unit time of the image forming apparatus.

21. The method according to claim 20, wherein the information about the number of printable sheets per unit time of the image forming apparatus is stuck to the optical box as an identification label.

22. An image forming apparatus comprising a light scanning apparatus, the light scanning apparatus comprising:
   a light source;
   a rotary polygon mirror configured to deflect a light beam emitted from the light source;
   a reflection mirror configured to guide the light beam deflected by the rotary polygon mirror onto a photosensitive member; and
   an optical box to which the light source, the rotary polygon mirror, and the reflection mirror are attached,
   the light scanning apparatus being manufactured by a manufacturing method, comprising:
   forming the optical box,
      wherein the optical box which is formed by the forming has a plurality of protrusions configured to support the reflection mirror, the plurality of protrusions being arranged along a longitudinal direction of the reflection mirror at positions corresponding to one end side of the reflection mirror in the longitudinal direction of the reflection mirror which is to be attached to the optical box, and has a support portion disposed at a position corresponding to the other end side of the reflection mirror, and
      wherein the support portion and the plurality of protrusions are formed on the optical box so that a surface of the support portion and surfaces of all the plurality of protrusions on a side supporting the reflection mirror are located on a same plane;
   selecting a protrusion to be used for supporting the reflection mirror from among the plurality of protrusions based on information about a number of printable sheets per unit time of the image forming apparatus in which the optical box is to be mounted;
   processing a protrusion except at least one protrusion that is selected by the selecting so that the protrusion except the at least one protrusion that is selected by the selecting from among the plurality of protrusions disposed on the one end side of the reflection mirror which is to be attached to the optical box is out of contact with the reflection mirror;
   placing the reflection mirror on the at least one protrusion that has not been processed in the processing and the support portion; and
   fixing the reflection mirror, which has been placed on the at least one protrusion that has not been processed and the support portion in the placing, to the optical box.

23. The image forming apparatus according to claim 22, wherein the processing comprises melting the protrusion except the protrusion that is used for supporting the reflection mirror.

24. The image forming apparatus according to claim 23, wherein a groove is provided around each of the plurality of protrusions of the optical box which is formed by the forming.

25. The image forming apparatus according to claim 22, wherein the processing comprises cutting the protrusion except the protrusion that is used for supporting the reflection mirror.

26. The image forming apparatus according to claim 22, wherein a number of the protrusions to be selected by the selecting is one.

27. The image forming apparatus according to claim 22, wherein the optical box has the information about the number of printable sheets per unit time of the image forming apparatus.

28. The image forming apparatus according to claim 27, wherein the information about the number of printable sheets per unit time of the image forming apparatus is stuck to the optical box as an identification label.

29. A method of manufacturing a light scanning apparatus to be mounted in an image forming apparatus, the light scanning apparatus comprising a light source, a rotary polygon mirror configured to deflect a light beam emitted from the light source, a reflection mirror configured to guide the light beam deflected by the rotary polygon mirror onto a photosensitive member, and an optical box to which the light source, the rotary polygon mirror and the reflection mirror are attached, the method comprising:
    forming the optical box,
        wherein the optical box which is formed by the forming has a plurality of protrusions configured to support the reflection mirror, the plurality of protrusions being arranged along a longitudinal direction of the reflection mirror which is to be attached to the optical box,
        wherein the plurality of protrusions are provided at positions corresponding to one end side of the reflection mirror in the longitudinal direction of the reflection mirror which is to be attached to the optical box and positions corresponding to the other end side of the reflection mirror, respectively, and
        wherein the plurality of protrusions are formed on the optical box so that all the plurality of protrusions come into contact with the reflection mirror, assuming that the reflection mirror is placed on the plurality of protrusions;
    selecting a plurality of protrusions to be used for supporting the reflection mirror, based on information about a number of printable sheets per unit time of the image forming apparatus in which the optical box is to be mounted, by selecting at least one from each of the plurality of protrusions disposed on the one end side of the refection mirror which is to be attached to the optical box and the plurality of protrusions disposed on the other end side of the refection mirror which is to be attached to the optical box;
    processing protrusions except the plurality of protrusions that are selected by the selecting so that a protrusion except the at least one protrusion that is selected by the selecting from among the plurality of protrusions disposed on the one end side of the reflection mirror which is to be attached to the optical box is out of contact with the reflection mirror, and so that a protrusion except the at least one protrusion that is selected by the selecting from among the plurality of protrusions disposed on the other end side of the reflection mirror which is to be attached to the optical box is out of contact with the reflection mirror;
    placing the reflection mirror on the protrusions that have not been processed in the processing; and
    fixing the reflection mirror, which has been placed on the protrusions that have not been processed in the placing, to the optical box.

30. The method according to claim 29, wherein a number of the protrusions to be selected by the selecting is two.

31. The method according to claim 30, wherein the optical box has the information about the number of printable sheets per unit time of the image forming apparatus.

32. The method according to claim 31, wherein the information about the number of printable sheets per unit time of the image forming apparatus is stuck to the optical box as an identification label.

33. The method according to claim 29, wherein the processing comprises melting the protrusions except the protrusions that are used for supporting the reflection mirror.

34. The method according to claim 33, wherein a groove is provided around each of the plurality of protrusions of the optical box which is formed by the forming.

35. The method according to claim 29, wherein the processing comprises cutting the protrusions except the protrusions that are used for supporting the reflection mirror.

36. An image forming apparatus comprising a light scanning apparatus, the light scanning apparatus comprising:
    a light source;
    a rotary polygon mirror configured to deflect a light beam emitted from the light source;
    a reflection mirror configured to guide the light beam deflected by the rotary polygon mirror onto a photosensitive member; and
    an optical box to which the light source, the rotary polygon mirror, and the reflection mirror are attached,
    the light scanning apparatus being manufactured by a manufacturing method, comprising:
    forming the optical box,
        wherein the optical box which is formed by the forming has a plurality of protrusions configured to support the reflection mirror, the plurality of protrusions being arranged along a longitudinal direction of the reflection mirror which is to be attached to the optical box,
        wherein the plurality of protrusions are provided at positions corresponding to one end side of the reflection mirror in the longitudinal direction of the reflection mirror which is to be attached to the optical box and positions corresponding to the other end side of the reflection mirror, respectively, and
        wherein the plurality of protrusions are formed on the optical box so that all the plurality of protrusions come into contact with the reflection mirror, assuming that the reflection mirror is placed on the plurality of protrusions;
    selecting a plurality of protrusions to be used for supporting the reflection mirror, based on information about a number of printable sheets per unit time of the image forming apparatus in which the optical box is to be mounted, by selecting at least one from each of the plurality of protrusions disposed on the one end side of the refection mirror which is to be attached to the optical box and the plurality of protrusions disposed on the other end side of the refection mirror which is to be attached to the optical box;
    processing protrusions except the plurality of protrusions that are selected by the selecting so that a protrusion except the at least one protrusion that is selected by the selecting from among the plurality of protrusions disposed on the one end side of the reflection mirror which is to be attached to the optical box is out of contact with the reflection mirror, and so that a protrusion except the at least one protrusion that is selected by the selecting from among the plurality of protrusions disposed on the other end side of the reflection mirror which is to be attached to the optical box is out of contact with the reflection mirror;
    placing the reflection mirror on the protrusions that have not been processed in the processing; and
    fixing the reflection mirror, which has been placed on the protrusions that have not been processed in the placing, to the optical box.

37. The image forming apparatus according to claim 36, wherein a number of the protrusions to be selected by the selecting is two.

38. The image forming apparatus according to claim 36, wherein the optical box has the information about the number of printable sheets per unit time of the image forming apparatus.

39. The image forming apparatus according to claim 38, wherein the information about the number of printable sheets per unit time of the image forming apparatus is stuck to the optical box as an identification label.

40. The image forming apparatus according to claim 36, wherein the processing comprises melting the protrusions except the protrusions that are used for supporting the reflection mirror.

41. The image forming apparatus according to claim 40, wherein a groove is provided around each of the plurality of protrusions of the optical box which is formed by the forming.

42. The image forming apparatus according to claim 36, wherein the processing comprises cutting the protrusions except the protrusions that are used for supporting the reflection mirror.

43. A method of manufacturing a light scanning apparatus to be mounted in an image forming apparatus, the light scanning apparatus comprising a light source, a rotary polygon mirror configured to deflect a light beam emitted from the light source, a reflection mirror configured to guide the light beam deflected by the rotary polygon mirror onto a photosensitive member, and an optical box to which the light source, the rotary polygon mirror and the reflection mirror are attached, the method comprising:
forming the optical box,
wherein the optical box which is formed by the forming has a plurality of protrusions configured to support the reflection mirror, the plurality of protrusions being arranged along a longitudinal direction of the reflection mirror at positions corresponding to one end side of the reflection mirror in the longitudinal direction of the reflection mirror which is to be attached to the optical box, and has a support portion disposed at a position corresponding to the other end side of the reflection mirror, and
wherein the plurality of protrusions are formed on the optical box so that all the plurality of protrusions come into contact with the reflection mirror, assuming that the reflection mirror is placed on the plurality of protrusions;
selecting a protrusion to be used for supporting the reflection mirror from among the plurality of protrusions based on information about a number of printable sheets per unit time of the image forming apparatus in which the optical box is to be mounted;
processing a protrusion except at least one protrusion that is selected by the selecting so that the protrusion except the at least one protrusion that is selected by the selecting from among the plurality of protrusions disposed on the one end side of the reflection mirror which is to be attached to the optical box is out of contact with the reflection mirror;
placing the reflection mirror on the at least one protrusion that has not been processed in the processing and the support portion; and
fixing the reflection mirror, which has been placed on the at least one protrusion that has not been processed and the support portion in the placing, to the optical box.

44. The method according to claim 43, wherein a number of the protrusions to be selected by the selecting is one.

45. The method according to claim 43, wherein the optical box has the information about the number of printable sheets per unit time of the image forming apparatus.

46. The method according to claim 45, wherein the information about the number of printable sheets per unit time of the image forming apparatus is stuck to the optical box as an identification label.

47. The method according to claim 43, wherein the processing comprises melting the protrusion except the protrusion that is used for supporting the reflection mirror.

48. The method according to claim 47, wherein a groove is provided around each of the plurality of protrusions of the optical box which is formed by the forming.

49. The method according to claim 43, wherein the processing comprises cutting the protrusion except the protrusion that is used for supporting the reflection mirror.

50. An image forming apparatus comprising a light scanning apparatus, the light scanning apparatus comprising:
a light source;
a rotary polygon mirror configured to deflect a light beam emitted from the light source;
a reflection mirror configured to guide the light beam deflected by the rotary polygon mirror onto a photosensitive member; and
an optical box to which the light source, the rotary polygon mirror, and the reflection mirror are attached,
the light scanning apparatus being manufactured by a manufacturing method, comprising:
forming the optical box,
wherein the optical box which is formed by the forming has a plurality of protrusions configured to support the reflection mirror, the plurality of protrusions being arranged along a longitudinal direction of the reflection mirror at positions corresponding to one end side of the reflection mirror in the longitudinal direction of the reflection mirror which is to be attached to the optical box, and has a support portion disposed at a position corresponding to the other end side of the reflection mirror, and
wherein the plurality of protrusions are formed on the optical box so that all the plurality of protrusions come into contact with the reflection mirror, assuming that the reflection mirror is placed on the plurality of protrusions;
selecting a protrusion to be used for supporting the reflection mirror from among the plurality of protrusions based on information about a number of printable sheets per unit time of the image forming apparatus in which the optical box is to be mounted;
processing a protrusion except at least one protrusion that is selected by the selecting so that the protrusion except the at least one protrusion that is selected by the selecting from among the plurality of protrusions disposed on the one end side of the reflection mirror which is to be attached to the optical box is out of contact with the reflection mirror;
placing the reflection mirror on the at least one protrusion that has not been processed in the processing and the support portion; and
fixing the reflection mirror, which has been placed on the at least one protrusion that has not been processed and the support portion in the placing, to the optical box.

51. The image forming apparatus according to claim 50, wherein a number of the protrusions to be selected by the selecting is one.

52. The image forming apparatus according to claim 50, wherein the optical box has the information about the number of printable sheets per unit time of the image forming apparatus.

53. The image forming apparatus according to claim 52, wherein the information about the number of printable sheets per unit time of the image forming apparatus is stuck to the optical box as an identification label.

54. The image forming apparatus according to claim 50, wherein the processing comprises melting the protrusions except the protrusions that are used for supporting the reflection mirror.

55. The image forming apparatus according to claim 54, wherein a groove is provided around each of the plurality of protrusions of the optical box which is formed by the forming.

56. The image forming apparatus according to claim 50, wherein the processing comprises cutting the protrusions except the protrusions that are used for supporting the reflection mirror.

* * * * *